Patented June 16, 1953

2,642,415

UNITED STATES PATENT OFFICE 2,642,415

SILYL AROMATIC COMPOUNDS

Field H. Winslow, Springdale, N. J., assignor to Bell Telephone Laboratories, Incorporated, New York, N. Y., a corporation of New York No Drawing. Application April 28, 1951,
Serial No. 223,640

10 Claims. (Cl. 260—80)

This invention relates to polymerizable, silicon containing compounds and to polymers thereof.

The compounds of the present invention are of the structure:

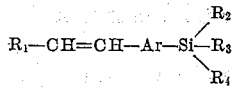

wherein $R_1$ is hydrogen or a hydrocarbon radical, Ar is an aromatic nucleus and $R_2$, $R_3$ and $R_4$ are hydrocarbon radicals. The most readily prepared of these compounds are the trialkyl silyl styrenes, particularly trimethyl silyl styrene and triethyl silyl styrene.

The compounds can be polymerized through the unsaturated carbon-to-carbon bonds in the radical $R_1$, in the same manner as polymerizable unsaturated hydrocarbon monomers such as styrene, by heating them in the presence of a polymerization catalyst such as benzoyl peroxide. The molecular structure of polymers formed from these compounds offers aging properties not possessed by similar polymeric substances.

Ordinarily, when polymers with hydrocarbon chains are subjected to weathering, their long molecular chains are gradually cleaved, due principally to the action of air, light and heat. As such a degradation process continues, the average molecular weight drops, producing corresponding changes in physical properties such as loss of strength and increasing brittleness in solids and loss of viscosity in liquids.

In the polymers of the present invention, this cleavage of the hydrocarbon chains is offset by the cross-linking action of air and heat upon the silyl groups which are carried as side groups by the hydrocarbon polymer chains. These silyl groups are trisubstituted with alkyl groups or other hydrocarbon radicals containing no non-benzenoid unsaturation. The action of air and heat tends to cause either rearrangement of these silyl groups or the formation of siloxane type bridges, resulting in the formation of new linkages between adjacent polymer chains. The formation of these new linkages through the silicon atoms tends to increase the average molecular weight of the polymer at the same time that the cleavage of the hydrocarbon chains is tending to decrease the average molecular weight. Hence the combined effect of the simultaneous degradation and cross-linking processes is toward preservation of the initial physical characteristics of the polymer.

The silyl compounds of the present invention, from which the desirable polymers referred to above can be formed, can be prepared by the reaction of the corresponding nuclear silylarylmagnesium halides with an aldehyde to yield silylated aryl α-substituted carbinols with subsequent dehydration to the corresponding silylated unsaturated hydrocarbon. The reactions proceed as follows:

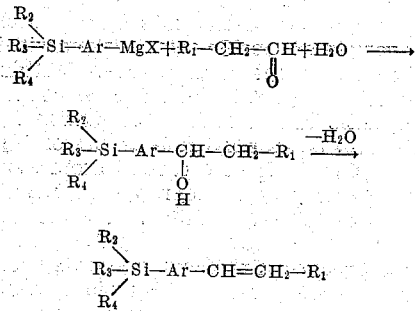

where $R_1$, $R_2$, $R_3$ and $R_4$ are the radicals referred to above.

The following specific examples will illustrate the manner in which the compounds of the present invention can be prepared and from them the polymers of the present invention.

Example 1

A Grignard reagent was prepared by reacting 275 grams of p-trimethylsilyl bromobenzene with 30 grams of magnesium turnings in 430 grams of dry ethyl ether. A mixture, consisting of 60 grams of acetaldehyde and 1000 milliliters of ethyl ether which had been cooled to $-70°$ C., was slowly added with vigorous stirring over a period of two hours to the reaction products held at about $-10°$ C. The products were brought to room temperature and were then poured into 1000 grams of cracked ice, forming an emulsion with the water resulting from the melting ice. The emulsion was broken, by the addition of one per cent sulfuric acid, and formed an aqueous layer and an ether layer which were separated from one another. The aqueous layer was extracted twice with ether and the washings were added to the ether layer. The ether layer was then dried with a water absorbing agent and distilled at atmospheric pressure to remove the ether. A final distillation at a pressure of 20 millimeters of mercury gave 141 grams of p-trimethylsilyl-α-methyl benzyl alcohol. This silylbenzyl alcohol was dehydrated by passing a 124-gram sample through a bed of activated alumina at a temperature of between 280° C. and 320° C. and a pressure of 50 millimeters of mercury. The product was 75.5 grams of p-(trimethylsilyl) styrene. This compound was polymerized to a clear, hard substance by adding one per cent benzoyl peroxide and heating at 80° C. for eight hours. The resulting rigid polymer was soluble in toluene, ethyl acetate, ethyl ether and dichloroethylene but insoluble in methanol. A cylindrical sample of the polymer 325 mils deep by 375 mils in diameter was tested in a parallel plate plastometer under an initial dead weight load of 360 pounds per square inch. The compression was observed as follows:

| Temperature | Compression | Time |
|---|---|---|
| | Mils | Hours |
| 68° C | 0.4 | 6 |
| 72° C | 4.4 | 6 |
| 90° C | 141.0 | 1 |

*Example 2*

The procedure described in Example 1 was followed starting with p-triethylsilyl bromobenzene to produce p-(trimethylsilyl) styrene and from it the polymer of this material. The polymer produced by heating at 80° C. for eight hours with one per cent benzoyl peroxide was a tacky mass.

The compounds of the present invention can have a variety of specific compositions within the broad structure set forth above. Within this structure, $R_1$ is preferably hydrogen but may be any aliphatic or aromatic hydrocarbon radical. Thus $R_1$ may be an alkyl radical, preferably containing not more than 6 carbon atoms, such as methyl, ethyl, propyl, isopropyl or butyl or it may be an aromatic radical such as phenyl, benzyl, toluyl or naphthyl. $R_2$, $R_3$ and $R_4$ may be any hydrocarbon radicals, preferably containing no non-benzenoid unsaturation, preferably containing not more than 6 carbon atoms, and may be, for instance, alkyl radicals, such as methyl, ethyl, propyl, butyl, amyl, hexyl or cyclohexyl radicals, or aromatic radicals such as phenyl, naphthyl, toluyl or xylyl radicals. $R_2$, $R_3$ and $R_4$ may be the same or different radicals in the same compound. The aromatic nucleus may be any divalent aromatic radical such as o-, m-, or p-phenylene, or any of the naphthlene radicals, with or without one or more alkyl radicals substituted thereon.

Polymers may be formed simply by the polymerization of these compounds, in which case the polymers will be essentially linear, fusible and soluble. The compounds can also be copolymerized with other monomers, which may also be linear polymer forming monomers, such as styrene or methyl methacrylate, or cross-linking monomers, such as divinyl benzene, trivinyl benzene or tetraallyl silane. Copolymers with cross-linking monomers will be cross-linked and may be infusible and insoluble.

The polymers of the present invention are useful for a variety of purposes. They can be molded and cast and can be used as adhesives, plasticizers or coating compositions or for the formation of laminated products. They are particularly adapted to formation in the shape of small spheres by polymerization in suspension in an aqueous medium, thus making possible the formation of small spheres of polymers containing both carbon and silicon. These spheres can be subjected to pyrolysis in nitrogen to form carbon spheres containing silicon which are useful as microphone granules.

The invention has been described in terms of its specific embodiments and, since certain modifications and equivalents may be apparent to those skilled in the art, this description is intended to be illustrative of but not necessarily to constitute a limitation upon the scope of the invention.

What is claimed is:

1. A compound of the structure:

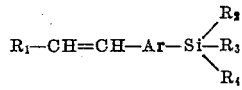

wherein $R_1$ is selected from the group consisting of hydrogen and hydrocarbon radicals containing no non-benzenoid unsaturation, Ar is a phenylene radical and $R_2$, $R_3$ and $R_4$ are each hydrocarbon radicals containing no non-benzenoid unsaturation.

2. A compound as defined in claim 1 wherein $R_1$ is hydrogen and wherein $R_2$, $R_3$ and $R_4$ each contain not more than 6 carbon atoms.

3. A polymer of the compound defined in claim 1.

4. Para-(trimethyl silyl) styrene.

5. Para-(triethyl silyl) styrene.

6. A para-(trialkyl silyl) styrene.

7. Styrene having a trialkyl silyl radical substituted on its benzene ring.

8. Polymeric para-(trimethyl silyl) styrene.

9. Polymeric para-(triethyl silyl) styrene.

10. A polymer of styrene having a trialkyl silyl radical substituted on its benzene ring.

FIELD H. WINSLOW.

References Cited in the file of this patent

UNITED STATES PATENTS

| Number | Name | Date |
|---|---|---|
| 2,426,121 | Rust et al. | Aug. 16, 1947 |
| 2,469,154 | Bunnell et al. | May 3, 1949 |